United States Patent
Maeda

(10) Patent No.: US 7,411,614 B2
(45) Date of Patent: Aug. 12, 2008

(54) IMAGE SENSING APPARATUS AND METHOD

(75) Inventor: Koji Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 701 days.

(21) Appl. No.: 10/246,288

(22) Filed: Sep. 18, 2002

(65) Prior Publication Data

US 2003/0058351 A1    Mar. 27, 2003

(30) Foreign Application Priority Data

Sep. 21, 2001    (JP) ............................. 2001-289679

(51) Int. Cl.
*H04N 9/73*    (2006.01)
*G06K 9/00*    (2006.01)
*H04N 5/228*    (2006.01)

(52) U.S. Cl. .................... 348/223.1; 348/244; 348/254; 382/162

(58) Field of Classification Search .................. 382/162, 382/167, 169; 348/223.1, 254
See application file for complete search history.

(56) References Cited

U.S. PATENT DOCUMENTS

| 5,021,875 | A | * | 6/1991 | Iida et al. .................. 348/227.1 |
| 5,448,502 | A | * | 9/1995 | Kindo et al. ................ 382/165 |
| 5,481,302 | A | * | 1/1996 | Yamamoto et al. ........ 348/223.1 |
| 5,568,194 | A | * | 10/1996 | Abe ........................ 348/223.1 |
| 6,160,579 | A | * | 12/2000 | Shiraiwa et al. .......... 348/224.1 |
| 6,707,491 | B1 | * | 3/2004 | Choi ........................ 348/223.1 |
| 6,727,942 | B1 | * | 4/2004 | Miyano .................... 348/223.1 |
| 6,791,606 | B1 | * | 9/2004 | Miyano .................... 348/223.1 |

FOREIGN PATENT DOCUMENTS

JP    6-90456    3/1994

\* cited by examiner

*Primary Examiner*—Ngoc-Yen Vu
*Assistant Examiner*—Carramah J Quiett
(74) *Attorney, Agent, or Firm*—Morgan & Finnegan, LLP

(57) ABSTRACT

It is an object of this invention to reduce image sensing errors due to wrong white balance control using wrong color temperature information in an image sensing device capable of performing white balance control using a color image signal from an image sensing device. In order to attain the above object, when the color in the vicinity of the locus of a blackbody cannot be extracted in detection of a color temperature in a color image signal, color temperature information is corrected on the basis of a piece of color temperature information output from a calorimetric sensor, thereby controlling the white balance of a color image signal output from an image sensing element. The number of achromatic data extracted from the color image signal is counted. The color temperature is calculated by weighting a color temperature obtained from the color image signal and that obtained from the colorimetric sensor in accordance with the count, thereby performing white balance control.

8 Claims, 5 Drawing Sheets

IMAGE SENSING APPARATUS AND METHOD

FIELD OF THE INVENTION

The present invention relates to an image sensing apparatus and method and, more particularly, to an image sensing apparatus having a white balance control function.

BACKGROUND OF THE INVENTION

Conventionally, an electronic still camera which captures an object image by a solid-state image sensing element such as a CCD and records it on a storage medium as a still image signal is known as an image sensing apparatus having a function of controlling the white balance of a color image signal. An electronic still camera of this type will be described below as an example.

In an electronic still camera of this type, to control the white balance of a sensed color image signal, three methods are available: a method of framing a sheet of white paper or the like within the entire field of the finder under the light source in a photographing place, photographing the sheet by manual operation in this state, detecting color temperature information using the sensed color image signal, and performing white balance control on the basis of the obtained color temperature information; a method of extracting achromatic image data from a photographed color image signal and determining the color temperature information of the light source from the information of the extracted image data; and a method of detecting color temperature information by a calorimetric sensor which detects the color temperature of ambient light.

If color temperature information is detected using a sheet of white paper or the like, the obtained color temperature information is almost accurate. However, the color temperature cannot predict in principle by a method of detecting color temperature information using a photographed color image signal, if achromatic data is not present in the image.

Also, if very little achromatic data is obtained from a color image signal, the detected color temperature information has a low reliability, i.e., accurate color temperature information cannot be obtained.

SUMMARY OF THE INVENTION

The present invention has been made against the above background, and has as its object to provide an image sensing apparatus and method which enable photographing with an appropriate white balance in white balance adjustment using a photographed color image signal.

In order to solve the above problems, according to the present invention, there is provided an image sensing apparatus comprising a white balance control device which controls white balance of an image output from the image sensing device on the basis of color temperature information obtained by weighting a piece of color temperature information detected by a color temperature detection device which detects a color temperature of ambient light and a piece of color temperature information obtained from an output of the image sensing device, the white balance control device acquiring the color temperature information in accordance with a data amount of image data which is determined to be achromatic in an image sensed by the image sensing device.

According to the present invention, there is provided a white balance control method wherein if white balance of an image output from an image sensing device is controlled on the basis of color temperature information obtained by weighting a piece of color temperature information detected by a color temperature detection device which detects a color temperature of ambient light and a piece of color temperature information obtained from an output of the image sensing device, the color temperature information is acquired in accordance with a data amount of image data which is determined to be achromatic in an image sensed by the image sensing device.

According to the present invention, if no color temperature information is detected in a color signal image or if detected color temperature information has a low reliability, relatively good white balance control can be performed.

Further, according to the present invention, only if a counted number of achromatic data of a color image signal output from an image sensing device upon completion of detection operation of detecting a color temperature in the color image signal output from the image sensing device falls within a predetermined range, a piece of color temperature information detected by a second detection device and a piece of color temperature information from a first detection device (calorimetric sensor) which detects a color temperature of ambient light are weighted in accordance with the count to calculate a new color temperature. If the piece of color temperature information detected in the color image signal output from the image sensing device has a low reliability, the weight ratio of the piece of color temperature information of the calorimetric sensor is increased. The weight ratio of the piece of color temperature information of the calorimetric sensor is reduced as the piece of color temperature information detected in the color image signal output from the image sensing device has a higher reliability. With this operation, satisfactory white balance control can be performed.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

An embodiment of the present invention will be described in detail with reference to the accompanying drawings.

Figure 1:
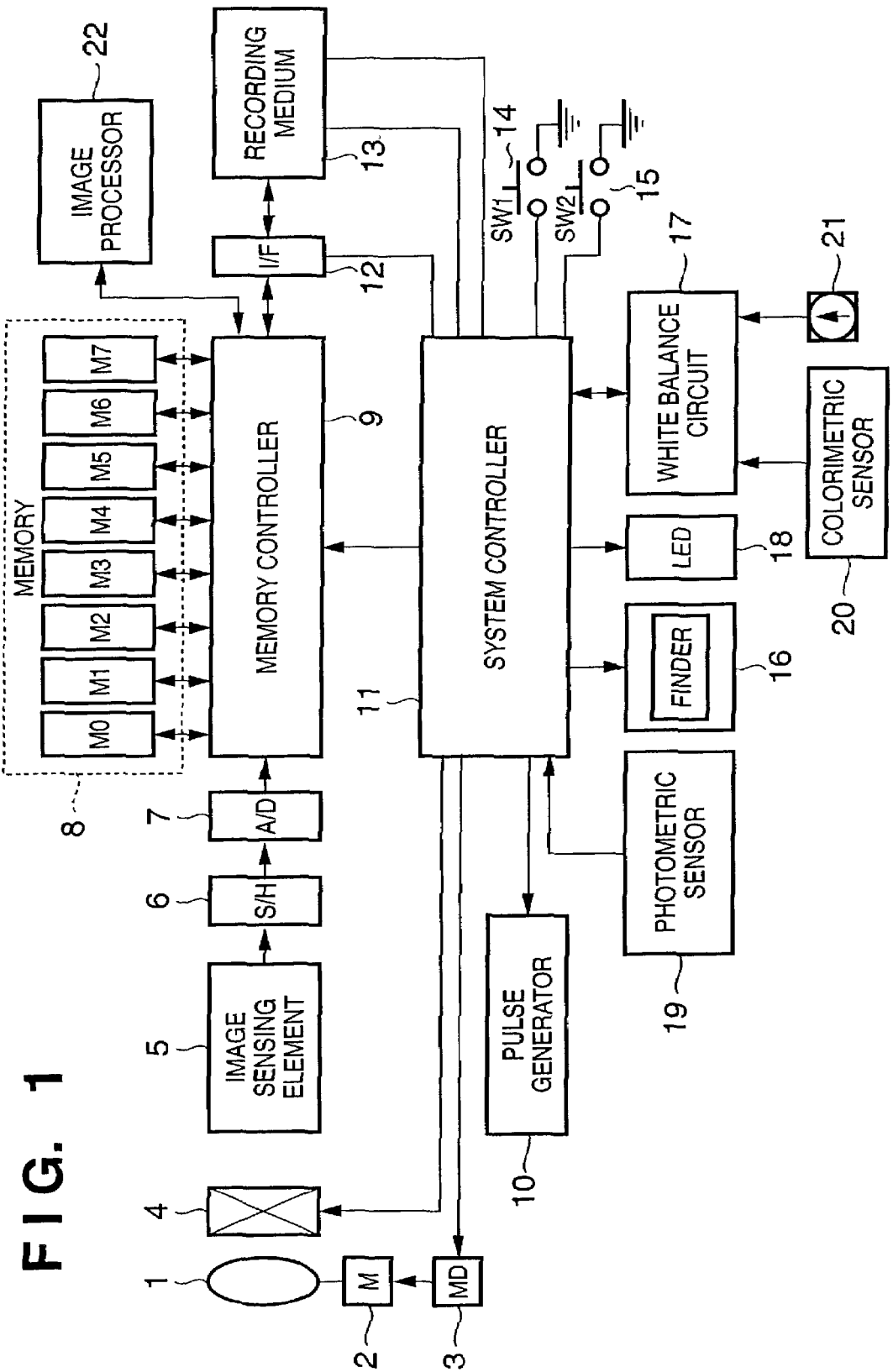
FIG. 1 is a block diagram showing the schematic arrangement of an electronic still camera according to an embodiment of the present invention.

FIG. 1 is a block diagram showing the schematic arrangement of an electronic still camera as an image sensing apparatus according to the embodiment of the present invention.

In FIG. 1, reference numeral 1 denotes an image sensing lens; 2, a lens driving motor; 3, a control unit of the lens driving motor 2; 4, a light quantity control member of, e.g., an aperture stop or shutter; and 5, a solid-state image sensing element such as a CCD. Reference numeral 6 denotes a sample/hold circuit which samples and holds a signal output from the solid-state image sensing element 5; 7, an A/D converter which A/D-converts an output signal from the sample/hold circuit 6; 8, a memory such as a DRAM; and 9, a memory controller which controls reading/writing of data from/in the memory 8, refresh operation of a DRAM, and the like.

Reference numeral 10 denotes a timing pulse generator, which generates a timing signal for driving the solid-state image sensing element 5, a sample/hold pulse used in the sample/hold circuit 6, a driving pulse for the A/D converter 7, and the like. Reference numeral 11 denotes a system controller for controlling a system of the entire apparatus such as a photographing sequence; 12, an interface between a recording medium 13 (to be described later) and the camera body; and 13, the recording medium such as a hard disk, memory card, or the like.

Reference numeral 14 denotes a standby switch SW1 for setting the camera in the photographing standby state; 15, a photographic switch SW2 for issuing a command to photograph; 16, a finder such as a detachable electronic viewfinder or optical finder; 17, a white balance circuit which performs white balance adjustment; 18, an LED which indicates whether or not the amount of achromatic data falls within a predetermined range in detection of the color temperature from a color image signal; and 19, a photometric sensor which measures the quantity of ambient light.

Reference numeral 20 denotes a calorimetric sensor for detecting the color temperature information of the ambient light; 21, a white balance mode switch which switches the white balance mode; and 22, an image processor which performs white balance correction, gamma correction, and the like for a digital color image signal obtained by photographing.

The signal flow in the electronic still camera according to the embodiment will be described below.

In photographing an object, if the standby switch SW1 14 is turned on by user operation, a signal obtained from the solid-state image sensing element 5 is sampled and held by the sample/hold circuit 6 into a color image signal, and then converted into a digital signal by the A/D converter 7.

The digitized color image signal is once stored in the memory 8. The image signal stored in the memory 8 is to be processed by the image processor 22 and finally recorded on the recording medium 13.

Next, the signal flow for white balance control as a characteristic feature of the present invention will be described.

A photographed image is stored in the memory 8. The image processor 22 performs white balance control for the image on the basis of color temperature information generated in a manner to be described later and stores the image in the memory 8 again. The image processor 22 counts the number of achromatic data, which are determined to be achromatic (white), in the image and holds the count.

An output from the calorimetric sensor 20 is supplied to the white balance circuit 17, where the color temperature information (external measurement data) is constantly updated. If achromatic data extracted from an image stored in the memory 8 does not reach a predetermined amount, this external measurement data is supplied to the image processor 22 through the system controller 11. The image processor 22 corrects the color temperature obtained from the image data stored in the memory 8 in the above manner using the external measurement data.

Figure 2:
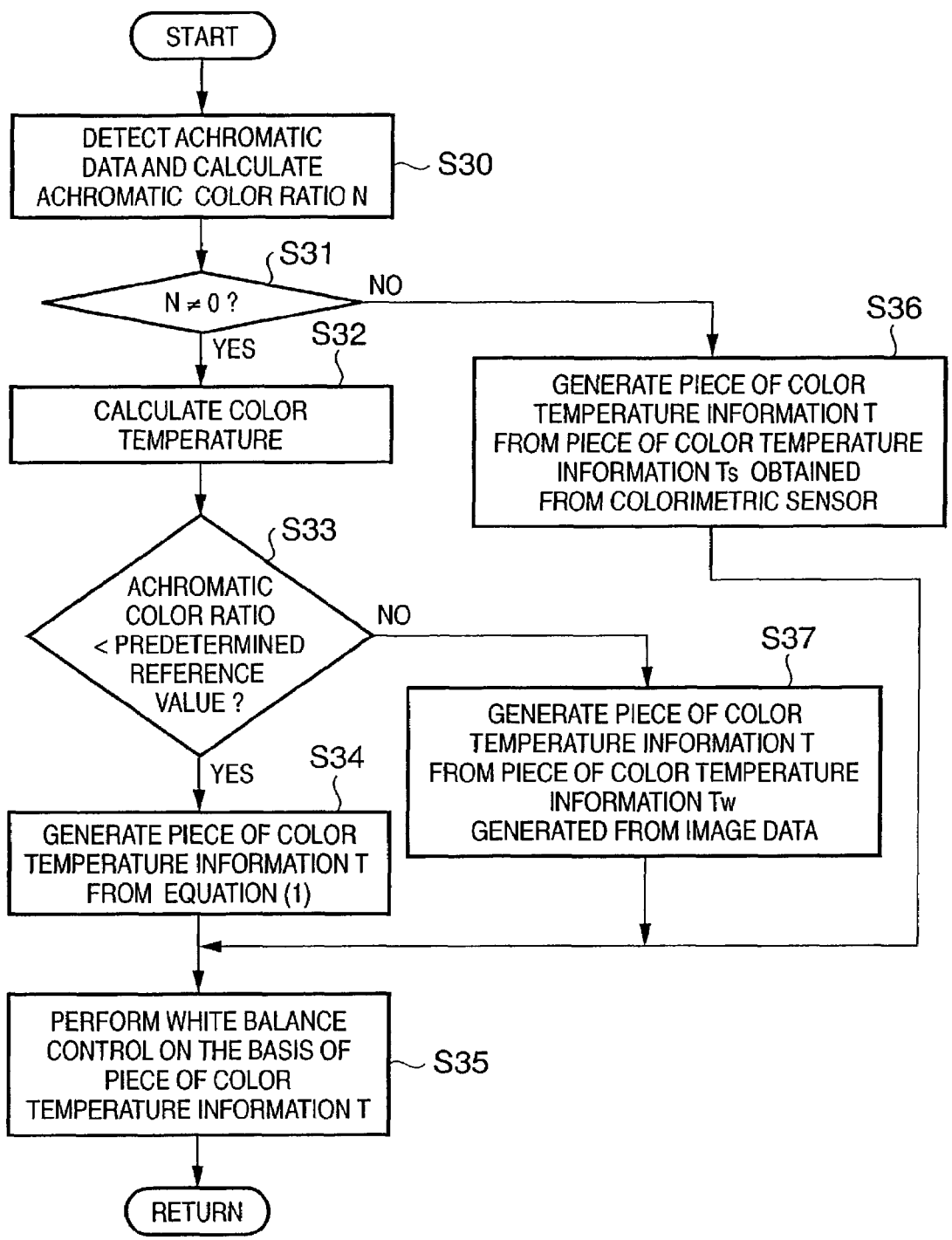
FIG. 2 is a flow chart for explaining the operation that pertains to white balance control in the electronic still camera of FIG. 1 with an emphasis on the operation of an image processor.
Figure 3:
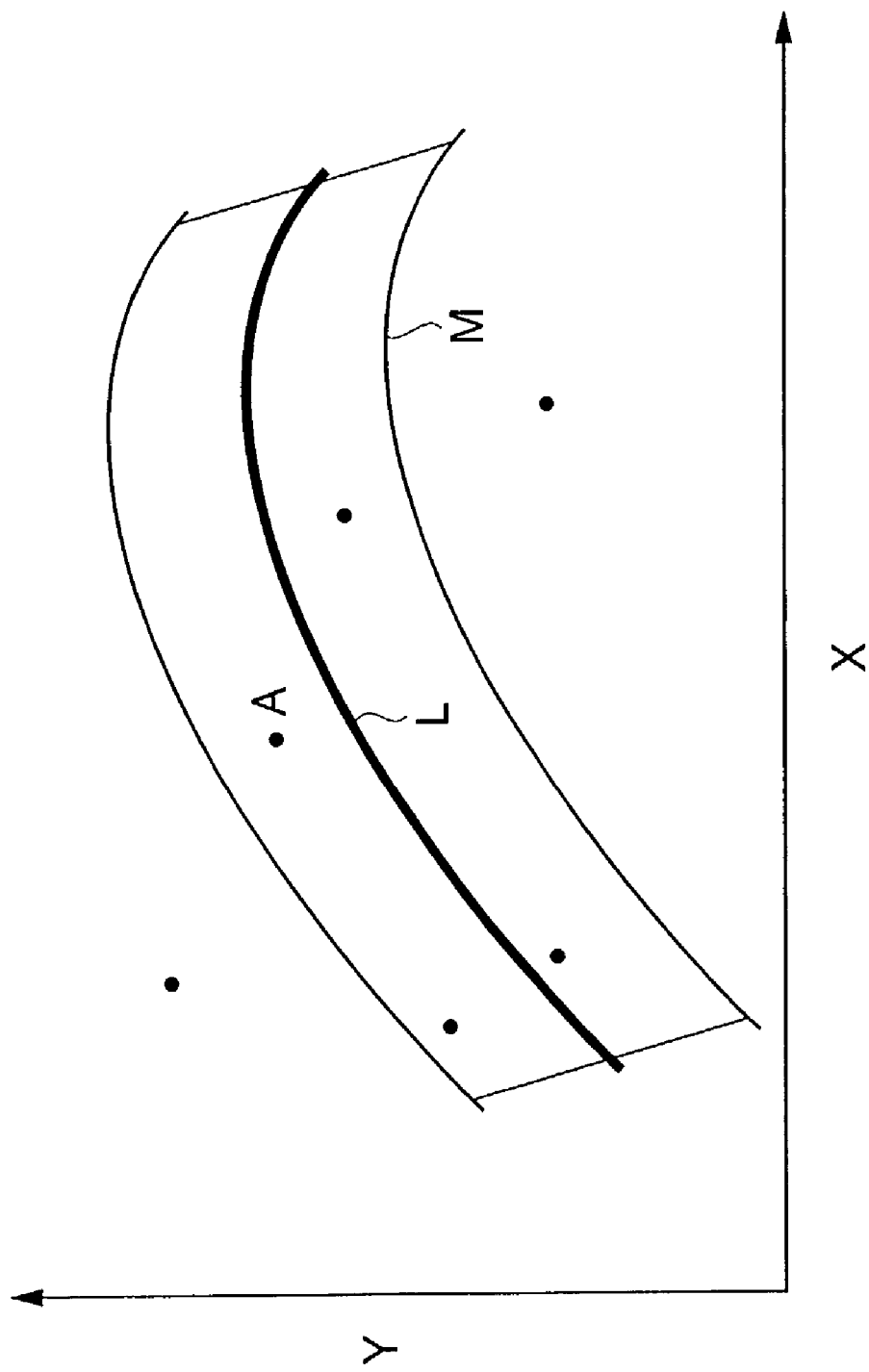
FIG. 3 is a graph for explaining the concept of achromatic color extraction and color temperature calculation algorithm of the flow chart of FIG. 2.

FIG. 2 is a flow chart showing the operation processing of generating color temperature information to perform white balance control of an image signal sensed in the electronic still camera of FIG. 1. FIG. 3 is a graph for explaining a routine which detects any achromatic (white) data in the flow chart of FIG. 2 and shows a region, which is determined to be achromatic (white), in color space coordinates. The operation that pertains to color temperature detection in the electronic still camera according to the embodiment will be described below.

Firstly, achromatic data in the image stored in the memory 8 is detected in step S30 in FIG. 2.

The processing contents of achromatic data detection in step S30 will be described below.

FIG. 3 is a graph of the X-Y plane of a color space, and L represents the locus of blackbody radiation. Data (e.g., a point A) in a region M which encloses the locus of blackbody radiation with a thin line is determined to be achromatic data. To determine how much achromatic data N1 is extracted with respect to the entire image data N0 in a frame, this ratio N N1/N0 is calculated.

In step S31, it is determined whether a predetermined amount or more of achromatic data is extracted or not. If no achromatic data is extracted (N=0), it is impossible to detect the color temperature in the image data. In this case, the flow advances to step S36, a piece of color temperature information Ts obtained by the calorimetric sensor 20 is received from the system controller 11, and the piece of color temperature information Ts is adopted as a piece of color temperature information T of the image data.

If some achromatic data is detected (N≠0) in step S31, the flow advances to step S32, where image data determined to be achromatic are picked up and added/averaged to calculate a piece of color temperature information Tw. The flow further advances to step S33 to determine how much achromatic data is extracted from the image in the frame. If the ratio N of achromatic data is equal to or more than a predetermined reference value K (N≧K), i.e., a predetermined amount or more of achromatic image data is contained in the frame, the piece of color temperature information Tw, which is calculated from the image data in achromatic color detection 101, is considered to have a high reliability. In this case, the flow advances to step S37, the piece of color temperature information Tw, which is calculated from the image data, is directly adopted as the piece of color temperature information T.

On the other hand, if it is determined in step S33 that the ratio N of achromatic data is less than the predetermined reference value K (N<K), i.e., the amount of achromatic image data contained in the frame is less than the predetermined amount, the piece of color temperature information Tw, which is calculated from the image data, is considered to have a low reliability. In this case, the flow advances to step S34, where the piece of color temperature information Ts obtained from the calorimetric sensor 20 and the piece of color temperature information Tw calculated in step S32 are weighted to generate appropriate color temperature information. More specifically, the image processor 22 receives the piece of color temperature information Ts of the calorimetric sensor 20 from the system controller 11 and calculates the piece of color temperature information T used for white balance control of the image data from the piece of color temperature information Tw calculated from the image data in step S32 and the piece of color temperature information Ts from the calorimetric sensor 20. Since the reliability of the piece of color temperature information Tw calculated from the image data in step S32 increases with an increase in amount of achromatic data (an increase in ratio N), the piece of color temperature information T is calculated in accordance with the following equation:

$$T=(N/K)*Tw+(1-N/K)*Ts \quad (1)$$

Then, the flow advances to step S35, where a white balance control value is calculated on the basis of the thus obtained piece of color temperature information T to control the white balance of the image.

Figure 4:
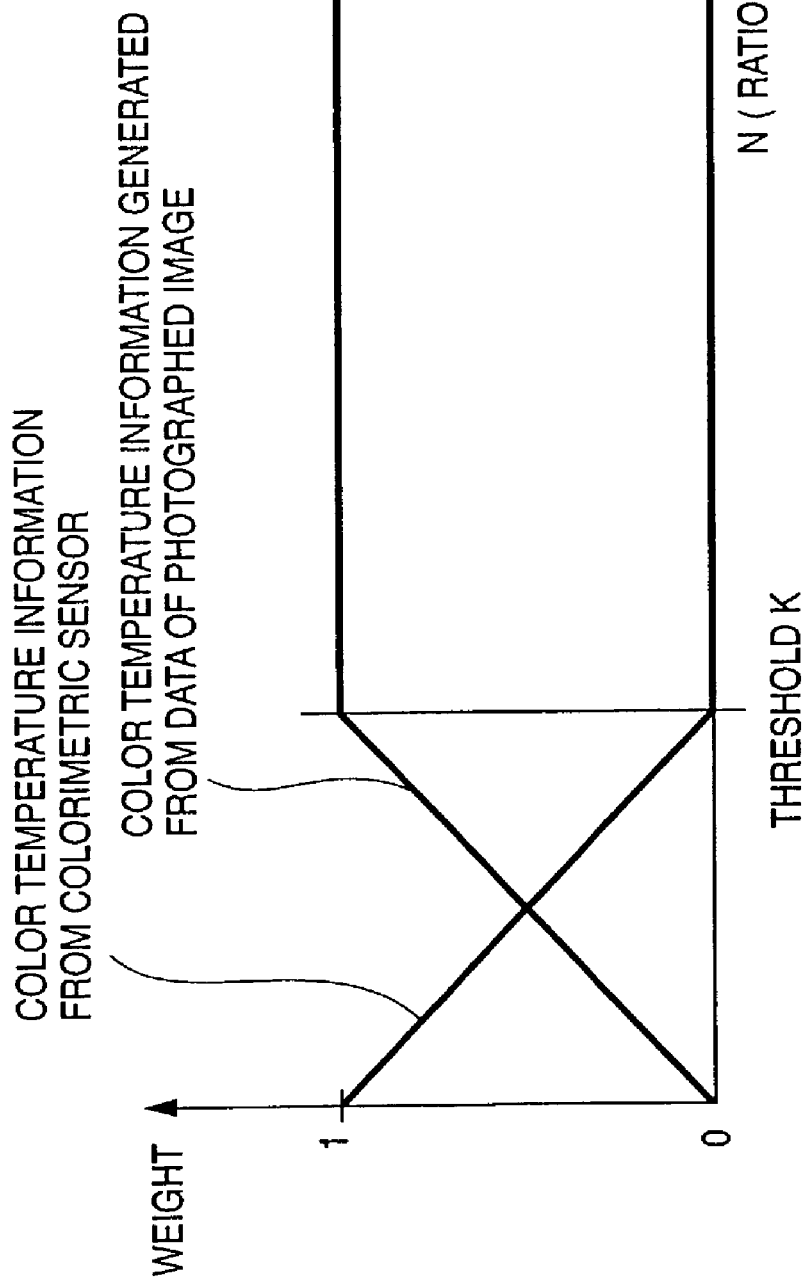
FIG. 4 is a graph representing an equation for recalculating a color temperature from a color temperature calculated in the flow chart of FIG. 2 and information from a calorimetric sensor.

FIG. 4 is a graph showing the correlation between the weight for the piece of color temperature information Tw calculated from the image data and that of the piece of color temperature information Ts from the calorimetric sensor 20 with respect to the ratio N of achromatic data.

If no achromatic data is detected, the weight for the piece of color temperature information Ts of the colorimetric sensor 20 is 1, and that for the piece of color temperature information Tw calculated from the image data is 0. As the ratio of achromatic data increases (N <K), i.e., the amount of achromatic image data contained in one frame increases, the weight ratio of the piece of color temperature information Tw is increased. In addition, if the ratio N of achromatic data is more than the predetermined reference value K, the weight for the piece of color temperature information Tw, which is calculated from the image data, is set to 1, and that of the piece of color temperature information Ts is set to 0.

As described above, according to the embodiment, if achromatic data is not present or a small amount of achromatic data is contained in an image sensed by an image sensing device, the color temperature information is corrected using the color temperature information of the calorimetric sensor 20, thereby performing appropriate white balance control.

In the above-described embodiment, if no achromatic image data is present in one frame, white balance control is performed using only the piece of color temperature information Ts of the calorimetric sensor 20. If a very small amount of achromatic image data is present in one frame as well, white balance control may be performed using only the piece of color temperature information Ts of the calorimetric sensor 20.

The functions of the image sensing apparatus according to the above embodiment and the sequence for the image sensing method can be implemented when the program stored in the RAM, ROM, or the like of the computer runs. This program and a computer-readable storage medium that records the program are included in an embodiment of the present invention.

More specifically, the program is supplied to the computer via a recording medium such as a CD-ROM or the like that records the program or various transmission media. As the recording medium which records the program, a flexible disk, hard disk, magnetic tape, magnetooptical disk, nonvolatile memory card, and the like can be used in addition to the CD-ROM. On the other hand, as the program transmission medium, communication media (wired channels such as optical fibers, wireless channels, and the like) in a computer network (LAN, WAN such as the Internet or the like, wireless communication network, and the like) system for supplying program information by transmitting it as a carrier can be used.

Such program is also included in an embodiment of the present invention when the functions of the above embodiment are implemented not only by executing the supplied program by the computer but also by collaboration of the computer, and an OS (operating system) running on the computer, another application software, or the like, and by executing some or all processes of the supplied program by a function extension board or unit of the computer.

Figure 5:
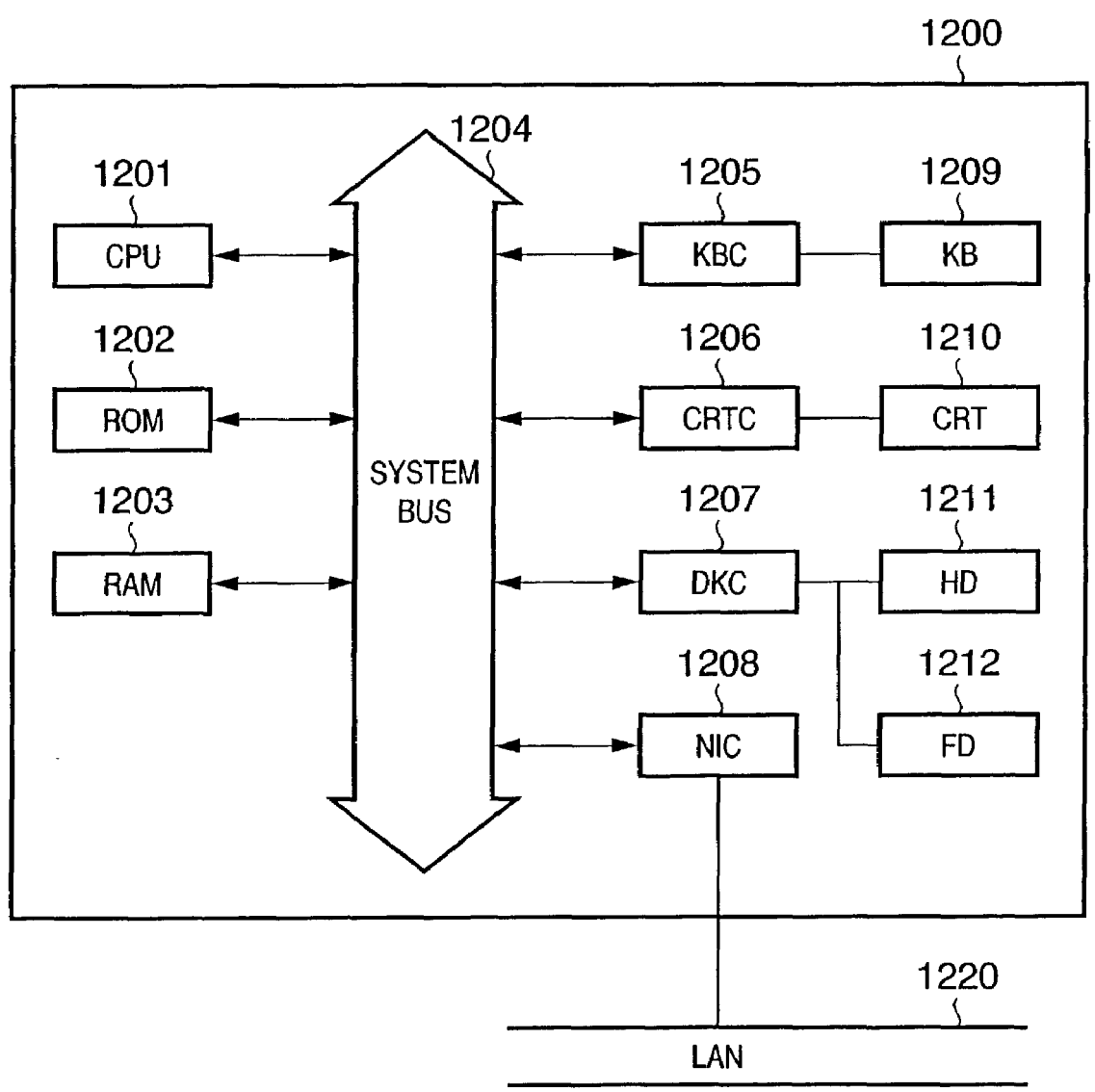
FIG. 5 is a diagram showing the internal structure of a general personal user terminal.

For example, FIG. 5 is a schematic diagram showing the internal arrangement of a general personal user terminal. In FIG. 5, reference numeral 1200 denotes a personal computer. The PC 1200 comprises a CPU 1201 and executes device control software stored in a ROM 1202 or hard disk (HD) 1211 or supplied from a flexible disk drive (FD) 1212 to systematically control respective devices connected via a system bus 1204.

According to the above embodiment, in an image sensing apparatus capable of performing white balance control using a color image signal from an image sensing device, wrong white balance control using wrong color temperature information can be avoided, thereby greatly decreasing photographic errors.

The present invention is not limited to the above embodiments and various changes and modifications can be made within the spirit and scope of the present invention. Therefore, to apprise the public of the scope of the present invention the following claims are made.

What is claimed is:

1. An image sensing apparatus comprising:
   an image sensing device which outputs a single output image;
   a first color temperature detection device which detects color temperature information of the single output image of said image sensing device by using the single output image of said image sensing device;
   a second color temperature detection device which detects color temperature information of an ambient light by a color sensor which does not use the single output image of said image sensing device;
   a calculation device which calculates a ratio of a white region in the single output image of said image sensing device;
   a generation device which generates weighted color temperature information by weighting the color temperature information of the single output image detected by said first color temperature detection device and the color temperature information of the ambient light detected by said second color temperature detection device so that the weighted color temperature information becomes closer to the color temperature information of the single output image as the ratio becomes larger, and the weighted color temperature information becomes closer to the color temperature information of the ambient light as the ratio becomes smaller; and
   a white balance control device which controls white balance of the single output image of said image sensing device by using the weighted color temperature information generated by said generation device,
   wherein, taking T to be a value corresponding to the weighted color temperature information, taking Tw to be a value corresponding to the color temperature information of the single output image, taking N to be a value corresponding to the ratio of the white region, and Ts to be a value corresponding to the color temperature information of the ambient light, T is generated in accordance with a formula:

$$T=N \times Tw/K+(1-N/K) \times Ts,$$

wherein K is a predetermined reference value to generate Tw as the weighted color temperature when N exceeds K.

2. The image sensing apparatus of claim 1, further comprising a memory which stores the single output image of said image sensing device, wherein said calculation device calculates the ratio of the white region by counting an amount of achromatic data of the single output image stored in said memory.

3. The image sensing apparatus of claim 1, wherein said image sensing apparatus is an electric still camera.

4. A white balance control method for an image sensing apparatus having an image sensing device which outputs a single output image, comprising:

detecting color temperature information of the single output image of said image sensing device by using the single output image of said image sensing device;

detecting color temperature information of an ambient light by a color sensor which does not use the single output image of said image sensing device;

calculating a ratio of a white region in the single output image of said image sensing device;

generating weighted color temperature information by weighting the detected color temperature information of the single output image and the detected color temperature information of the ambient light so that the weighted color temperature information becomes closer to the color temperature information of the single output image as the ratio becomes larger, and the weighted color temperature information becomes closer to the color temperature information of the ambient light as the ratio becomes smaller; and controlling white balance of the single output image of said image sensing device by using the generated weighted color temperature information, wherein, taking T to be a value corresponding to the weighted color temperature information, taking Tw to be a value corresponding to the color temperature information of the single output image, taking N to be a value corresponding to the ratio of the white region, and Ts to be a value corresponding to the color temperature information of the ambient light, T is generated in accordance with a formula:

$$T = N \times Tw/K + (1 - N/K) \times Ts,$$

wherein K is a predetermined reference value to generate Tw as the weighted color temperature when N exceeds K.

5. The white balance control method of claim 4, further comprising storing the single output image of said image sensing device in a memory, wherein said calculating comprises calculating the ratio of the white region by counting an amount of achromatic data of the single output image stored in said memory.

6. The white balance control method of claim 4, wherein said image sensing apparatus is an electric still camera.

7. A computer-readable recording medium encoded with a computer program for causing a computer to function as the devices of the image sensing apparatus defined in claim 1.

8. A computer-readable recording medium encoded with a computer program for causing a computer to execute procedures of the white balance control method defined in claim 4.

* * * * *